(12) United States Patent
Zhang

(10) Patent No.: US 8,440,340 B2
(45) Date of Patent: May 14, 2013

(54) BATTERY LATCHING ASSEMBLY FOR PORTABLE ELECTRONIC DEVICE

(75) Inventor: Yu Zhang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 476 days.

(21) Appl. No.: 12/768,700

(22) Filed: Apr. 27, 2010

(65) Prior Publication Data
US 2011/0159331 A1 Jun. 30, 2011

(30) Foreign Application Priority Data
Dec. 24, 2009 (CN) .......................... 2009 1 0312175

(51) Int. Cl.
*H01M 2/10* (2006.01)

(52) U.S. Cl.
USPC ............................................... 429/97; 429/96

(58) Field of Classification Search ...................... 429/97
See application file for complete search history.

(56) References Cited

U.S. PATENT DOCUMENTS
8,247,110 B2 * 8/2012 Li ................................. 429/175

* cited by examiner

*Primary Examiner* — Barbara Gilliam
*Assistant Examiner* — Gary Harris
(74) *Attorney, Agent, or Firm* — Altis Law Group, Inc.

(57) ABSTRACT

A battery latching assembly is used for a portable electronic device. The battery latching assembly includes a base body and a latching member. The base body defines a first hole and a second hole. The latching member is attached to the base body. The latching member includes a resisting block, a button portion and a bent arm. The resisting block is received in the first hole configured for abutting against a battery. The button portion is received in the second hole. The bent arm is deformed to allow the resisting block to separate from the first hole to releasably latch the battery.

11 Claims, 4 Drawing Sheets

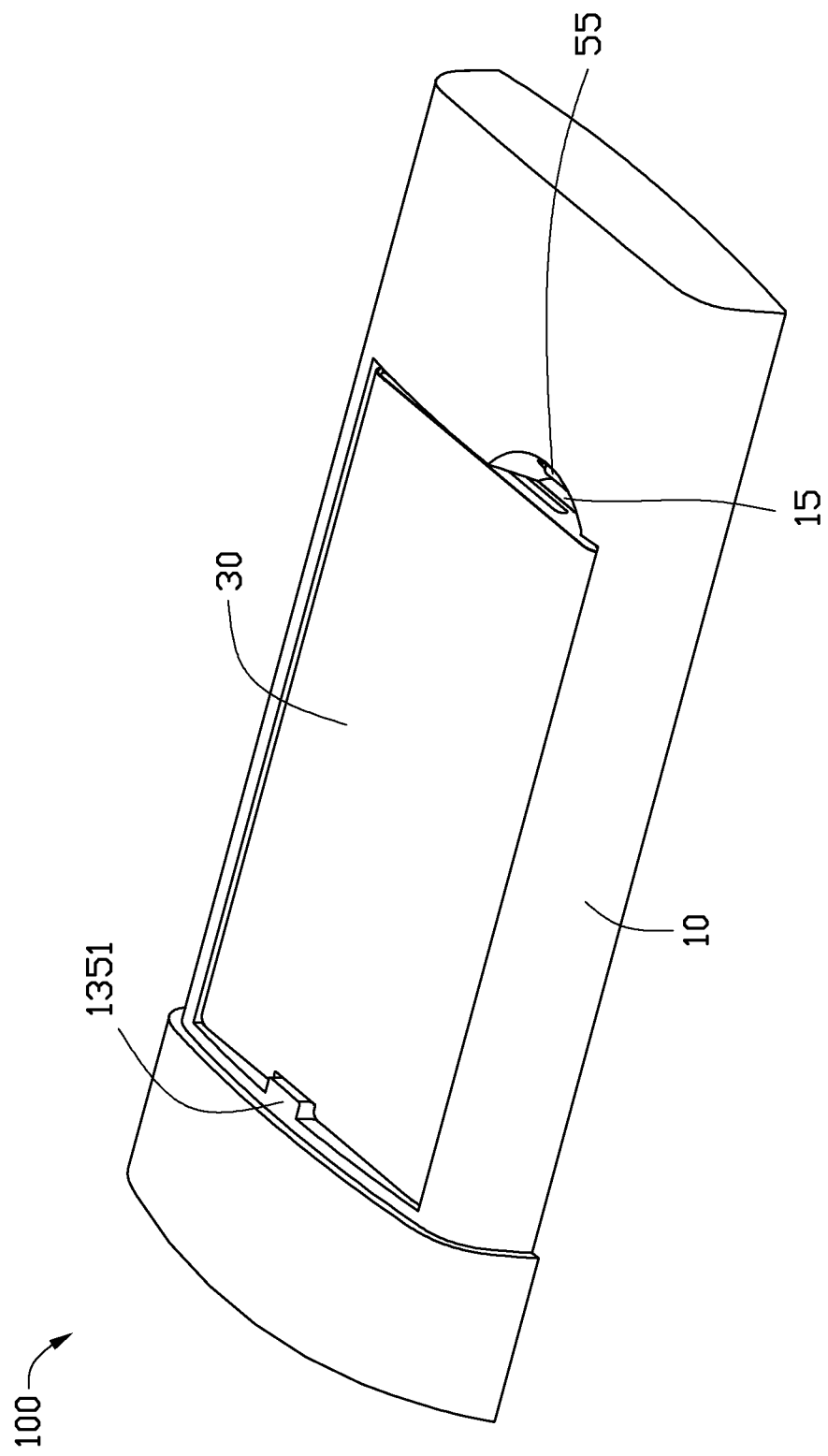

BATTERY LATCHING ASSEMBLY FOR PORTABLE ELECTRONIC DEVICE

BACKGROUND

1. Technical Field

The present disclosure generally relates to battery latching assemblies and, particularly, to a battery latching assembly for use in a portable electronic device.

2. Description of Related Art

Batteries are widely used in portable electronic devices, such as personal digital assistants (PDAs), mobile phones, and other devices. Conventional batteries are latched in the electronic device to secure a stable electrical connection.

Although battery latching assemblies may be simple, engagement between the battery and the housing of the mobile phone can be too firm to be easily separated.

Therefore, there is room for improvement within the art.

BRIEF DESCRIPTION OF THE DRAWINGS

Many aspects of the battery latching assembly can be better understood with reference to the following drawings. The components in the drawings are not necessarily drawn to scale, the emphasis instead placed upon clearly illustrating the principles of the battery latching assembly. Moreover, in the drawings, like reference numerals designate corresponding parts throughout the several views, in which:

FIG. 4 is similar to FIG. 3, but shown from another aspect.

DETAILED DESCRIPTION

Figure 1:
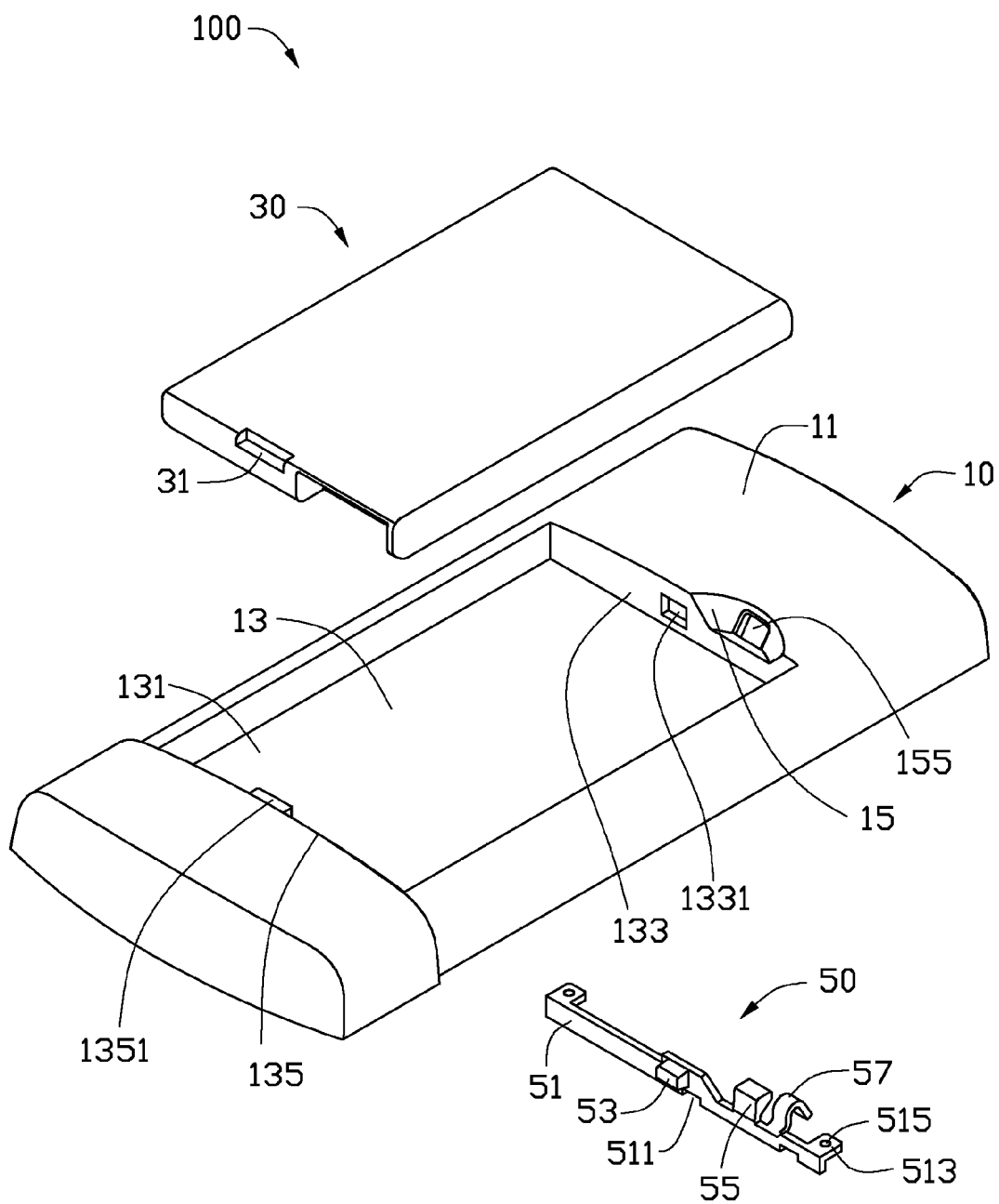
FIG. 1 is an exploded, isometric view of a portable electronic device employing a battery latching assembly in accordance with an exemplary embodiment.
Figure 2:
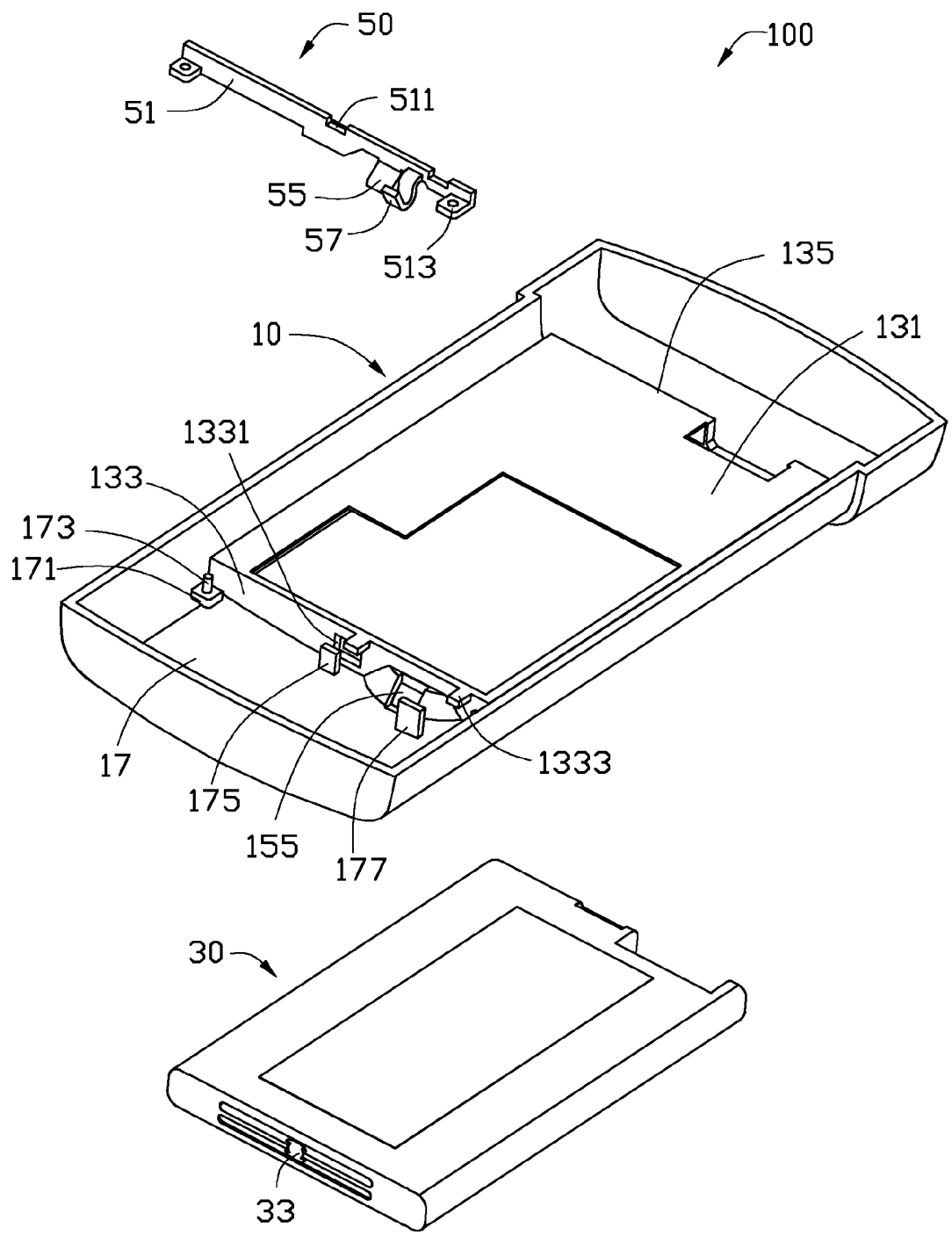
FIG. 2 is similar to FIG. 1, but shown from another aspect.

FIGS. 1 and 2 show a portable electronic device 100, such as a mobile phone, employing a battery latching assembly. The mobile phone 100 is an exemplary application, for the purposes of describing details of an exemplary embodiment of a battery latching assembly. The battery latching assembly incorporates a base body 10, a battery 30, and a latching member 50. The latching member 50 releasably latches the battery 30 to the base body 10.

The base body 10 includes a first surface 11 and an opposite second surface 17. A cavity 13 is recessed in the first surface 11, thus projecting from the second surface 17. The cavity 13 is used for receiving the battery 30. The cavity 13 includes a base portion 131, two opposite sidewalls 133, 135. The sidewall 133 defines a first hole 1331 and a concave portion 15. The first hole 1331 is positioned at a half way point of the sidewall 133. The concave portion 15 is disposed at an intersection between the sidewall 133 and the first surface 11. A second hole 155 is defined in the concave portion 15. Two tabs 1333 extend from one side of the sidewall 133 far away from the second surface 17. The sidewall 135 defines a projection 1351. Two stages 171 are disposed at the second surface 17 and contact the sidewall 133. A post 173 projects from each stage 171 for fixing the latching member 50. A limiting block 175 and a stopper block 177 are formed on the second surface 17. The limiting block 175, the stopper block 177, and the sidewall 133 together define a space for receiving the latching member 50.

The battery 30 defines a notch 31 and a groove 33 at two opposite ends thereof. The notch 31 is configured to receive the projection 1351. The groove 33 is opposite to the first hole 1331 of the sidewall 133.

The latching member 50 includes a main section 51. The main section 51 is substantially a long and narrow board, and defines two cutouts 511 at an edge thereof configured for engaging with the tabs 1333. A button portion 55 and a bent arm 57 extend from an opposite edge of the main section 51. The button portion 55 is configured to be received in the second hole 155. The bent arm 57 is configured to abut against the stopper block 177. Two protrusions 513 project from two ends of the main section 51. A through hole 515 is defined in the protrusion 513 for engaging with the post 173. A resisting block 53 projects from the main section 51 configured to be received in the first hole 1331 for resisting the battery 30.

Figure 3:
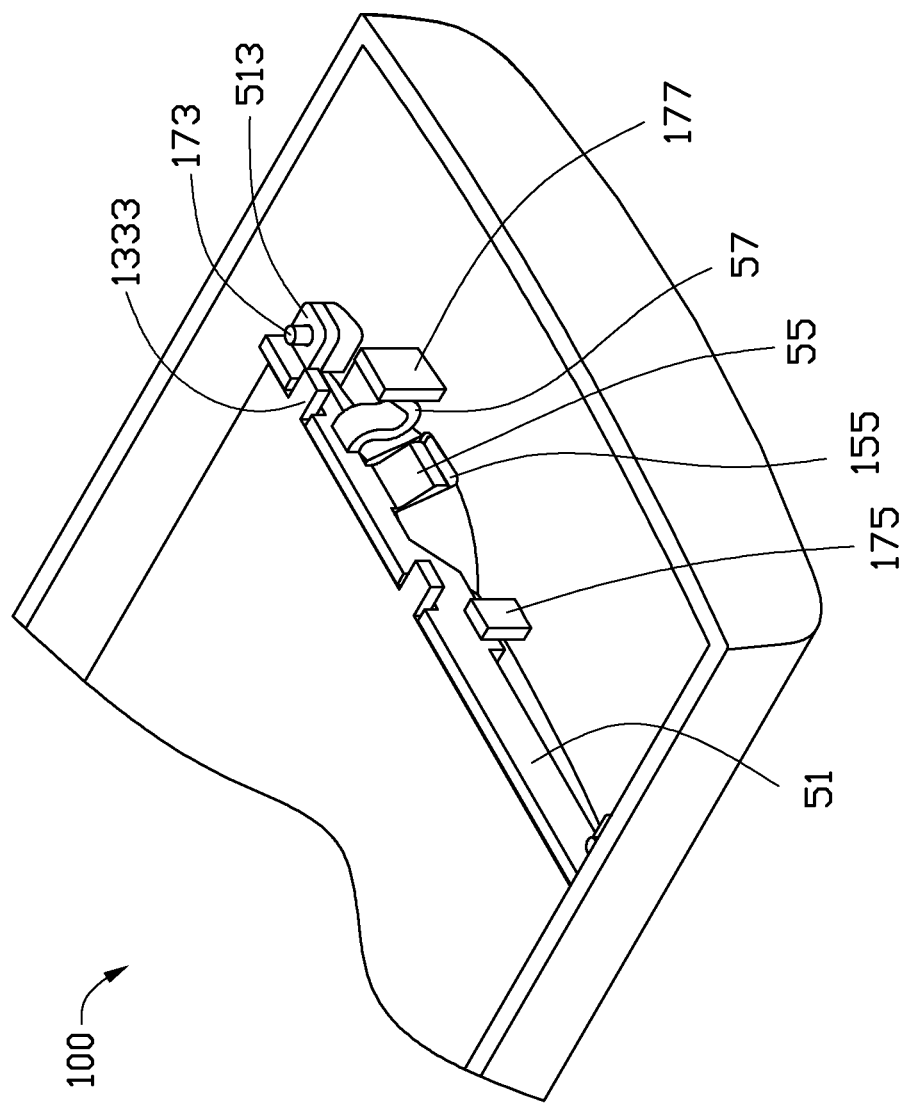
FIG. 3 is an assembled view of FIG. 1.

During assembly of the battery latching assembly, referring to FIGS. 3 and 4, first, the latching member 50 is attached the space between the sidewall 133 and the limiting block 175. The tabs 1333 are received in the cutouts 511. The resisting block 53 is engaged into the first hole 1331 for abutting against the battery 30. The button portion 55 is received in the second hole 155, and is exposed from the concave portion 15. The bent arm 57 elastically abuts against the stopper block 177. The protrusions 513 are positioned on the stages 171, and the posts 173 extend into the through holes 515. Thus, the latching element 50 is assembled in the base body 10.

To remove the battery 30, the button portion 55, which is exposed from the concave portion 15, is pressed. The arm 57 is deformed to allow the resisting block 53 to separate from the first hole 1331 so that the battery 30 can then be removed.

As described, the exemplary embodiment provides a battery latching assembly for portable electronic devices, such as mobile phones. The battery of the battery latching assembly can be easily opened.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely preferred or exemplary embodiments of the disclosure.

What is claimed is:

1. A battery latching assembly for a portable electronic device, the battery latching assembly comprising:

a base body defining a cavity bounded by a base portion, a first sidewall, and a second sidewall, the first sidewall defining a first hole and a second hole, the first hole and the second hole communicating with a first side and a second side of the first sidewall, wherein the second hole is in a concave section, two tabs projecting from the first side of the first sidewall and parallel to the base portion;

a latching member including a main section, a resisting block, a button portion and a bent arm integrally formed together, two cutouts defined at a first edge of the main section, the button portion and the bent arm extending from a second edge of the main section, the resisting block extending from one surface of the main section, the surface of the main section facing the first side of the first sidewall, the tabs latched in the cutouts for positioning the latching member on the base body, the resisting block extending into the first hole from the first side of the first sidewall, and exposed from the second side of the first sidewall configured for abutting against a battery, the button portion received in the second hole from the first side of the first sidewall and exposed from the second side of the first sidewall, the button portion is moved from the second side of the first sidewall to deform the bent arm deformed to allow the resisting block to separate from the first hole to releasably latch the battery.

2. The battery latching assembly as claimed in claim 1, wherein the base body includes two stages adjacent to the first side of the first sidewall, and the latching member includes two protrusions projecting from opposite ends of the main section and fixed to the stages.

3. The battery latching assembly as claimed in claim 2, wherein each protrusion defines a through hole, and a post projects from each stage engaging in the through hole.

4. The battery latching assembly as claimed in claim 1, wherein the base body includes a first surface and a second surface, the cavity is recessed in the first surface, and projects from the second surface.

5. The battery latching assembly as claimed in claim 4, wherein a concave portion is formed in the second side of the first sidewall, and the second hole is defined in the concave portion.

6. The battery latching assembly as claimed in claim 4, wherein a limiting block and a stopper block are formed on the second surface of the base body, the limiting block and the first side of the first sidewall are positioned at two sides of the latching member, and the bent arm abuts against the stopper block.

7. A portable electronic device comprising: a base body defining a cavity bounded by a base portion, a first sidewall, and a second sidewall, the first sidewall defining a first hole and a second hole, the first hole and the second hole communicating with a first side and a second side of the first sidewall, wherein the second hole is in a concave section, two tabs projecting from the first side of the first sidewall and parallel to the base portion;

a battery received in the cavity; and a latching member including a main section, a resisting block and a button portion integrally formed together, two cutouts defined at a first edge of the main section, the button portion extending from a second edge of the main section, the resisting block extending from one surface of the main section, the surface of the main section facing the first side of the first sidewall, the tabs latched in the cutouts for positioning the latching member on the base body, the resisting block extending into the first hole from the first side of the first sidewall, and exposed from the second side of the first sidewall and abutting against the battery, the button portion received in the second hole from the first side of the first sidewall and exposed from the second side of the first sidewall; wherein the button portion is pressed from the second side of the first sidewall, the resisting block is forced to separate from the first hole to releasably latch the battery.

8. The portable electronic device as claimed in claim 7, wherein the base body includes two stages adjacent to the first side of the first sidewall, and the latching member includes two protrusions fixed to the stages.

9. The portable electronic device as claimed in claim 8, wherein each protrusion defines a through hole, and a post projects from each stage engaging in the through hole.

10. The portable electronic device as claimed in claim 6, wherein a concave portion is formed in the sidewall, and the second hole is defined in the concave portion.

11. The portable electronic device as claimed in claim 10, wherein a limiting block and a stopper block are formed on the base body, the limiting block and the first side of the first sidewall are positioned at two sides of the latching member, a bent arm extends from the second edge of the main section adjacent to the button portion, and the bent arm abuts against the stopper block.

* * * * *